May 29, 1956 J. A. BUVELOT 2,747,264
RENEWING BRAKE HEADS
Filed June 30, 1950 3 Sheets-Sheet 3

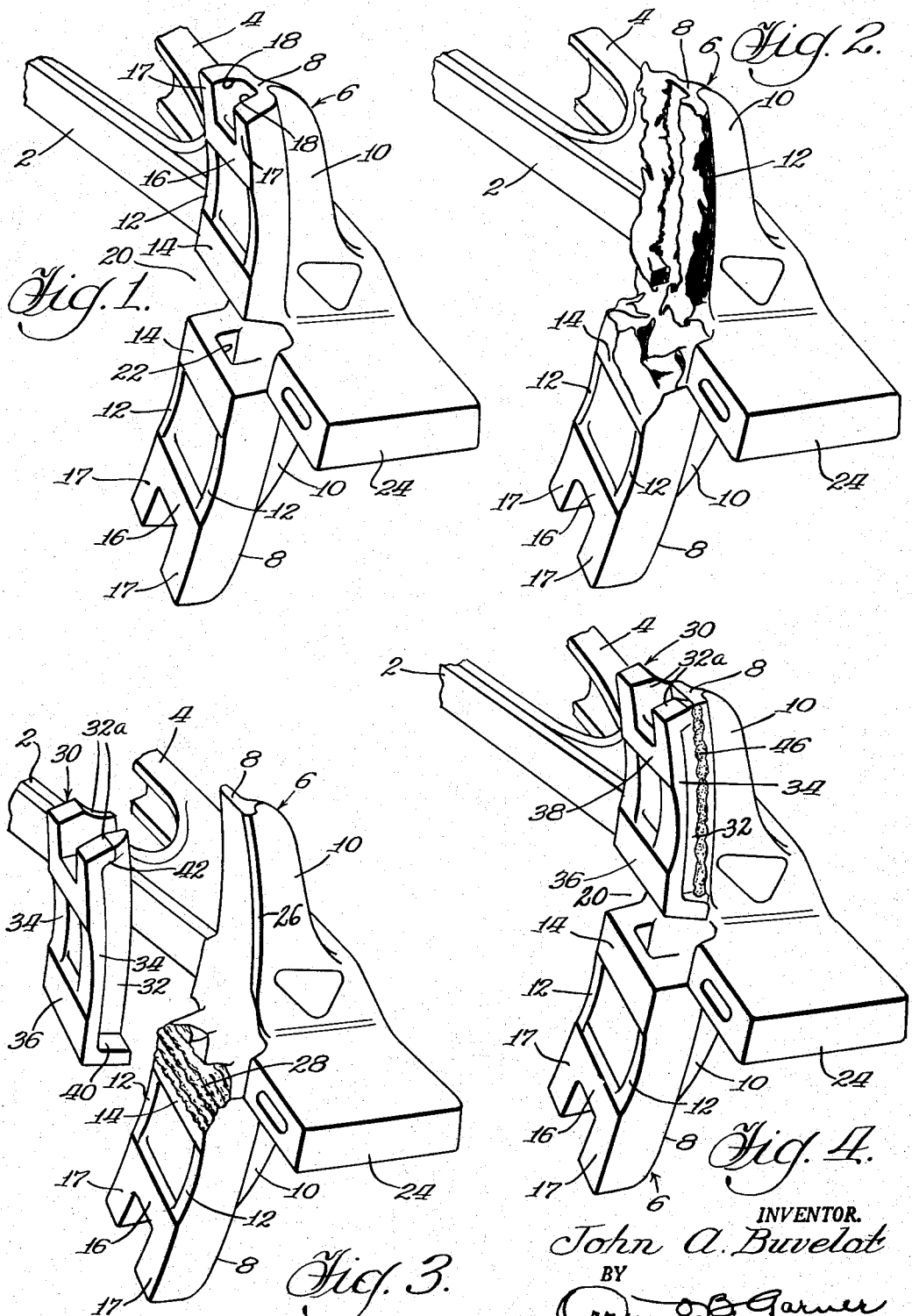

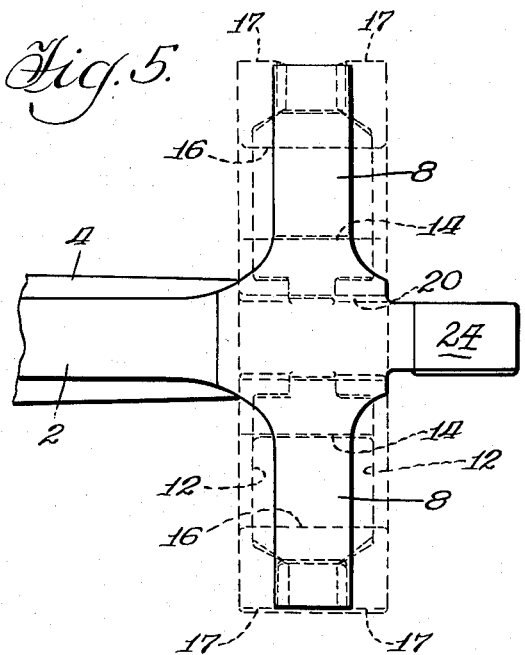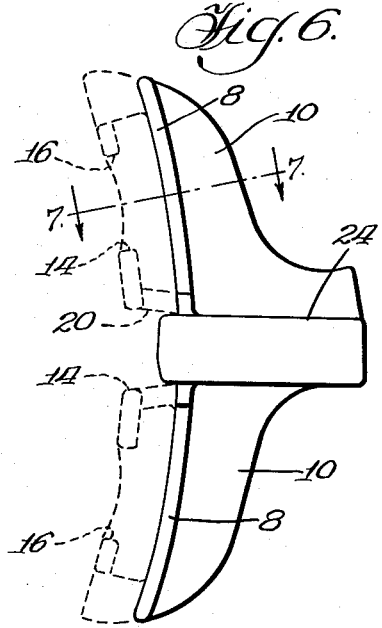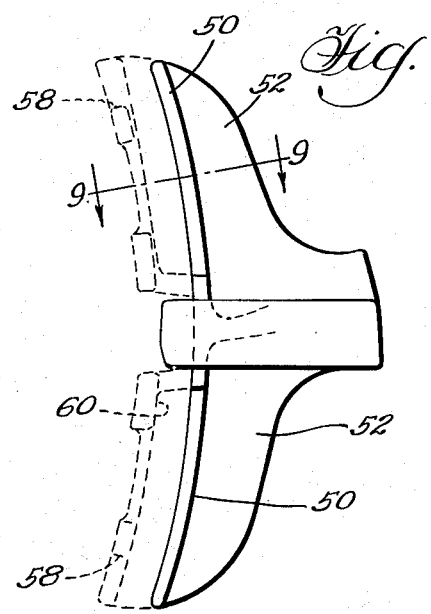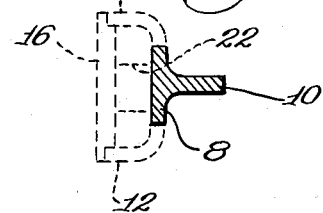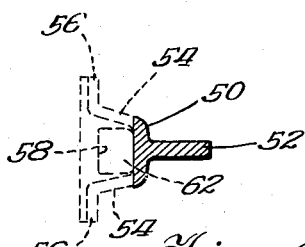
INVENTOR.
John A. Buvelot

INVENTOR.
John A. Buvelot
BY
Owen O. B. Garner
Atty.

By United States Patent Office 2,747,264
Patented May 29, 1956

2,747,264
RENEWING BRAKE HEADS

John A. Buvelot, Chicago, Ill., assignor to American Steel Foundries, Chicago, Ill., a corporation of New Jersey Application June 30, 1950, Serial No. 171,511

2 Claims. (Cl. 29—401)

This invention relates to the repairing of railway brake heads which are permanently attached, as by welding or casting, to brake beams such as are commonly used in the brake systems of railway car trucks.

According to prior art practice, worn or damaged brake heads have been repaired by building them up with weld metal and then grinding or otherwise finishing the weld metal to approximate conformity with the original structure. This technique has not only proved to be expensive, but ineffective, inasmuch as the repaired heads frequently differ in dimensions from the original heads, thereby complicating the application of brake shoes and sometimes resulting in loose shoes.

Accordingly, a primary object of the present invention is to devise a novel method whereby worn or damaged brake heads may be quickly and economically repaired.

A more specific object of the invention is to repair such heads by completely removing the worn or damaged structure therefrom and then welding a replacement segment thereto having the dimensions of the original structure.

A further object of the invention is to devise a novel replacement segment which may be applied to different types of beams.

Another object of the invention is to devise a replacement segment having spaced walls adapted to support associated brake shoe means in the usual manner, and particularly adapted for weldment to the front wall of a conventional brake head after removal of the brake shoe supporting structure therefrom.

The foregoing and other objects and advantages of the invention will become apparent from a consideration of the following specification and the accompanying drawings wherein:

Figure 1 is a fragmentary perspective view of a brake beam and head which may be repaired according to the invention;

Figure 2 is a fragmentary perspective view of the brake beam with the brake head damaged;

Figure 3 is an identical view showing the brake head after the damaged structure has been removed therefrom, preparatory to welding;

Figure 4 is a similar view showing the replacement segment welded to the front brake head wall;

Figure 5 is a front elevational view of the brake beam with the removed portions of the brake head shown in dot and dash lines;

Figure 6 is an end elevational view of the structure shown in Figure 5;

Figure 7 is a sectional view on line 7—7 of Figure 6;

Figure 8 is an end elevational view comparable to Figure 6 but showing a different form of brake head which may be repaired according to the novel method;

Figure 9 is a sectional view on the line 9—9 of Figure 8; and

Figure 10:
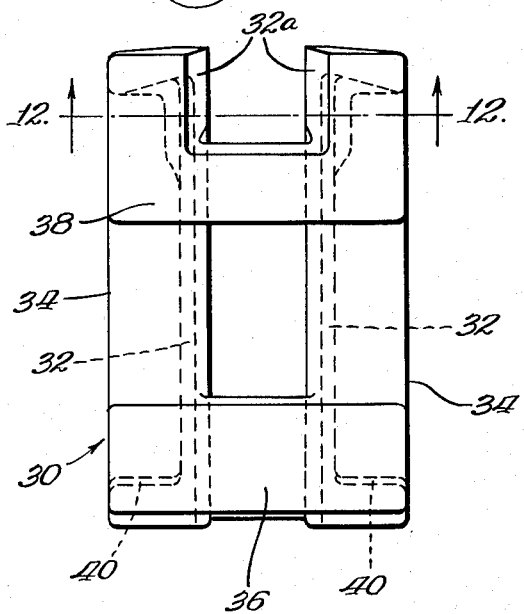
Figure 11:
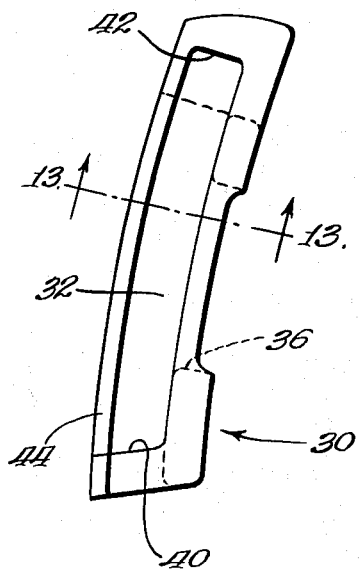
Figure 13:
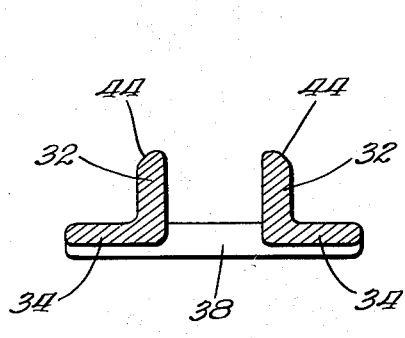
Figure 12:
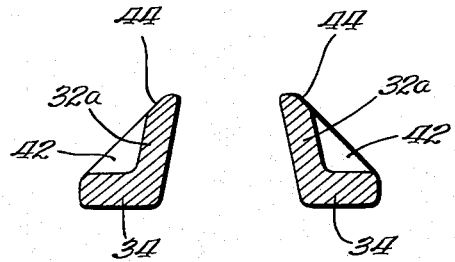

Figures 10 to 13, inclusive, illustrate the novel replacement segment which may be utilized in repairing either the beam of Figures 1 to 7 or the beam of Figures 8 and 9, Figure 10 being a front elevational view of the segment, Figure 11 being a side elevational view thereof, Figure 12 being a sectional view on the line 12—12 of Figure 10, and Figure 13 being a sectional view on the line 13—13 of Figure 11.

Describing the invention in detail and referring first to Figure 1, a conventional brake beam is illustrated having tension and compression members 2 and 4 connected at their outboard ends to a brake head generally designated 6, said head comprising top and bottom spaced segments each having a front wall 8 and a rear wall 10 cast integral with the brake beam tension and compression members 2 and 4. In the illustrated embodiment, each front wall 8 is connected to a pair of side walls 12 extending forwardly therefrom, and the inner ends of the side walls 12 are connected by a tie 14 adapted to afford a seat in the usual manner for associated brake shoe means (not shown). The walls 12, adjacent their outer ends, are connected by another tie 16 which, together with conventional spaced toe lugs 17 on the walls 12, outwardly of the tie 16, affords another seat for said brake shoe means. As best seen in the upper portion of Figure 1, the inner surfaces of the lugs 17 converge as at 18 to afford wedge faces for engagement with an associated brake shoe lug, and a space 20 between the top and bottom brake head segments affords a recess for another associated brake shoe lug.

The ties 14 and 16 are spaced from the front walls 8 and define therewith a keyway 22 extending continuously from the top to the bottom of the brake head for the reception of associated brake shoe key means (not shown). It will be understood that the key means and brake shoe means are conventional and may be of any suitable design, several of which are standard in the art.

The outboard side of the head is provided in the illustrated embodiment with a support lug 24 adapted to support the beam and head structure on an associated side frame ledge (not shown), although it will be understood that other conventional support means may be utilized as desired.

Referring now to Figure 2, the brake beam is illustrated with the brake head in a damaged condition, such as occasionally occurs in railway service; and it will be noted that the side walls 12, the ties 14 and 16, and the lugs 17 of the upper brake head segment are almost completely burned away, down to the front wall 8. The side walls 12 of the lower segment, at their inner ends, and the tie 14 of the lower segment are partially damaged.

Referring now to Figure 3, which illustrates the first step in the novel method, it will be seen that the side walls of the top brake head segment have been cut away, as for example by a conventional oxy-acetylene torch. If desired, the lateral edges of the wall 8 may be torch-cut to a bevel, as at 26, to facilitate a welding step hereinafter described.

In Figure 3, the inner ends of the side walls 12 of the lower brake head segment, as well as the tie 14 thereof, have been built up in the conventional manner by weld metal, indicated at 28.

Figure 3 also illustrates, in perspective view, a preferred form of replacement segment for use in the welding step to be described, said segment being generally designated 30 and being shown in detail in Figures 10 to 13, inclusive. The segment 30 comprises spaced lateral walls 32 having flanges 34 on their forward edges. The walls 32 and flanges 34 are connected on the front surfaces thereof by a tie 36 adapted to afford a seat on its front or forward face for associated brake shoe means, and the walls 32 and 34 are connected adjacent their opposite ends by another tie 38 which, together with the flange portions extending longitudinally therebeyond, is adapted to afford another seat for associated brake shoe means. As best seen in Figure 12, the ends of the walls 32 extending beyond the tie 38, are formed as converging segments 32a presenting rearwardly converging wedging faces on their adjacent surfaces.

The portions of the walls 32 and flanges 34, which are connected by the tie 36, are also connected at their ends by flanges 40 formed on the external surfaces of the walls 32; and the opposite ends of said walls are connected to the flanges 34 by gussets 42.

The rear edges of the walls 32 are beveled on their external surfaces as at 44 to afford rearwardly converging welding surfaces coplanar with the outer edges of respective gussets 42, as best seen in Figures 11–13.

Referring now to Figure 4, it will be seen that the beveled welding surfaces 44 of the segment 30 have been welded as at 46 to the lateral margins of the front wall 8 of the upper brake head segment. Also, the weld metal 28, shown in Figure 3, has been finished, as by grinding, so that the lower brake head segment is restored to its original contour shown in Figure 1. Inasmuch as the brake shoe engaging ties 36 and 38 of the segment 30, as well as the converging wall segments 32a thereof, have the same contour as the corresponding parts of the original upper brake head segment, the beam, as illustrated in Figure 4, is again suitable for use in railway interchange service as a standard A. A. R. brake beam.

Referring now to Figures 5 to 7, the brake beam, heretofore described, is illustrated in somewhat diagrammatic fashion to show, in dot and dash lines, the portions which may be cut away during the above-described first step of the novel method; and in this connection, it will be noted that if necessary or desirable, both the upper and lower brake head segments may be replaced by the before-mentioned segments 30. It may be also noted, as best seen in Figure 7, that, if desired, the lateral margins of the front wall 8 may be cut away approximately parallel to the rear wall 10, thereby eliminating the bevel shown at 26 in Figure 3.

Referring now to Figures 8 and 9, a different form of standard A. A. R. beam is illustrated which may be required according to the foregoing method with the same form of replacement segment 30 as is used in repairing the beams of Figures 1 to 7. The brake head of Figures 8 and 9 comprises top and bottom segments, each having front and rear walls 50 and 52. The lateral margins of each front wall 50 are connected to side walls 54 which are flanged as at 56 on their forward edges, the flanged portions of said walls 54 being connected by a tie 58 adjacent their outer ends and affording a seat on its forward surface for associated brake shoe means. The inner ends of the flanged portions 56 of the walls 54 are connected by a tie 60 affording a seat on its forward surface for said brake shoe means.

As best seen in Figure 9, the walls 50 and 54, as well as the ties 58 and 60, define a keyway 62 affording from top to bottom of the brake head and adapted to receive associated key means for securing brake shoe means thereto, said means being conventional in form and therefore not being illustrated, as heretofore discussed in connection with Figures 1 to 7.

It may be noted that both of the above-described beams are frequently used in railway service; and for this reason, an unique feature of the invention resides in the fact that the novel form of repair segment 30, which has heretofore been described in detail, may be utilized in connection with the novel process to repair either type of beam, thereby avoiding the necessity of stocking different replacement parts for the replacement beams. Thus, it will be understood that the invention comprises a novel and economical method of repairing brake heads without the necessity of building up the damaged parts by weld metal and then finishing the weld metal to conformity with the original brake head contour. The invention also comprises a novel form of replacement segment which may be utilized in repairing the top and bottom segments of both standard beams heretofore described.

I claim:

1. As a new article of manufacture for use in the repair of damaged brake heads, a brake head segment comprising spaced side walls having forward edges adapted to be secured to a brake shoe and having rear beveled welding edges adapted to be secured to a substantially flat flange of a brake head, flanges on the remote side of said walls at the front edges thereof, a tie connecting the front edges of said walls at corresponding ends thereof, said walls having at said ends thereof and on the remote sides thereof flanges connected to the first-mentioned flanges, the rear edges of said walls being free from direct connection to each other, another tie connecting the front edges of said walls intermediate their ends, and gussets on the remote sides of said walls at the opposite corresponding ends thereof and merging with the first-mentioned flange.

2. The method of repairing a damaged brake head segment of a brake beam having permanently attached upper and lower brake head segments each provided with a front wall and two side walls projecting forwardly from the front wall, which method comprises torch cutting away the side walls of the damaged brake head segment, cutting away and beveling the lateral edges of the front wall of the damaged segment to facilitate welding, cutting beveled welding portions on the rear edges of spaced side walls of a replacement segment having ties interconnecting the front edges of its spaced side walls, assembling the replacement segment on the front wall of the damaged brake head segment, and then welding the beveled portions of the side walls of the replacement segment to the beveled lateral edges of the front wall of the damaged brake head segment.

References Cited in the file of this patent

UNITED STATES PATENTS

| | | |
|---|---|---|
| 868,970 | Crone | Oct. 22, 1907 |
| 901,872 | Bowman et al. | Oct. 20, 1908 |
| 1,340,032 | Fleming | May 11, 1920 |
| 1,935,865 | Turner | Nov. 21, 1933 |
| 2,170,115 | Busch | Aug. 22, 1939 |
| 2,170,116 | Busch | Aug. 22, 1939 |
| 2,170,117 | Busch | Aug. 22, 1939 |
| 2,253,031 | Johnson | Aug. 19, 1941 |
| 2,278,386 | Whitney | Mar. 31, 1942 |
| 2,480,953 | Osner | Sept. 6, 1949 |
| 2,499,905 | Cottrell | Mar. 7, 1950 |
| 2,500,192 | Leisk | Mar. 14, 1950 |
| 2,525,775 | Cottrell | Oct. 17, 1950 |
| 2,593,374 | Whitney | Apr. 15, 1952 |